Reissued July 23, 1940

Re. 21,511

UNITED STATES PATENT OFFICE 21,511

HYDROGENATED BROWN CAMPHOR OIL AND METHOD OF PREPARING THE SAME

Marion Scott Carpenter, Nutley, N. J., assignor to Givaudan-Delawanna, Inc., New York, N. Y., a corporation of New York No Drawing. Original No. 2,125,832, dated August 2, 1938, Serial No. 95,855, August 13, 1936. Application for reissue January 24, 1940, Serial No. 315,397

6 Claims. (Cl. 252—122)

This invention relates to the hydrogenation of brown camphor oil, or of selected fractions thereof, and to perfuming agents produced thereby.

The so-called brown camphor oil is that portion of the oil obtained from the camphor tree which remains after the crystalline camphor has been removed by filtration or other means. It consists principally of terpenes, sesqui-terpenes and safrol, the latter to the extent of 40 to 50%. This product is widely used in the soap industry as a perfuming agent to mask the "soapy odor" of laundry and toilet soaps. The active constituent of the oil, from the olfactory point of view, is the safrol.

When brown camphor oil is chilled to a low temperature the safrol crystallizes out and may be removed by filtering. If there is added to the safrol, which liquefies upon warming to ordinary temperatures, sufficient of the liquid fraction previously filtered off, so that the safrol content of the mixture is about 80%, the resulting oil approximates in odor and composition the oil obtained from the sassafras tree. Under the name artificial sassafras oil it is widely used as a perfuming agent.

I have now made the discovery that if brown camphor oil or artificial sassafras oil are hydrogenated their value as perfuming agents in soap is greatly enhanced. With the conditions under which I operate the hydrogenation is confined principally to the reduction of the safrol to dihydrosafrol although the terpenes and other constituents may be altered to some extent, and the color of the hydrogenated oil is lighter than that of the original oil.

I am aware that dihydrosafrol was prepared and described by Ciamician and Silber in 1890 (Berichte der deutschen chemischen Gesellschaft, vol. 23, page 1162), but in view of their description of it as having "a weak, safrol-like odor" it could not be anticipated that it has an odor strength approximately three times as great as safrol, which I have found actually to be the case. In addition to its enhanced odor strength I have found that dihydrosafrol has a much finer odor than safrol and approximates very closely the true sassafras odor. Thus the value of such hydrogenated products containing dihydrosafrol is apparent: a pound of the hydrogenated oil will flavor or perfume approximately three times as much material as will the non-hydrogenated oil, and the flavor or perfume will be considerably finer.

The hydrogenation of the above described oils may be effected by the well-known sodium-alcohol method or by other familiar methods but I prefer to introduce gaseous hydrogen in the presence of a nickel catalyst. Without intending to limit myself to any certain procedure I cite the following example:

One pound of nickel catalyst is added to two hundred pounds of brown camphor oil or artificial sassafras oil in a suitable vessel equipped with an agitator, an inlet tube for hydrogen gas leading to the bottom of the vessel and a cover fitted with an outlet tube or vent. The vent is connected to a liquid seal or bubble tube. The air in the space above the oil is swept out with a stream of hydrogen; then the agitator is started and the hydrogen flow is adjusted so that the gas is completely absorbed and none escapes through the bubbler tube. The absorption commences immediately and is usually accompanied by a rise in temperature which may reach 60–70° C. When the absorption is complete the temperature starts to drop and hydrogen escapes through the bubbler tube. At this point the flow of hydrogen is cut off, the agitator stopped, and the hydrogenated oil is allowed to cool. The catalyst settles to the bottom and after the oil has been decanted may be used for the hydrogenation of subsequent batches of starting material. In my process the hydrogenation is carried out until the unsaturated side chain of the safrol is completely hydrogenated to dihydrosafrol. The hydrogenated oils are usually somewhat lighter colored than the original oils and require only a simple filtration to remove traces of suspended nickel before use.

It is understood that the invention is not to be limited by the foregoing but is to be construed as broadly as permissible in view of the prior art limited solely by the appended claims.

The invention claimed is:

1. Method of preparing a perfuming agent having an odor approximately three times the strength of the starting material which comprises treating a substance selected from the group consisting of "brown camphor oil" and "artificial sassafras oil" with hydrogen in the presence of a nickel catalyst until the unsaturated side chain of the safrol contained in the oil is completely hydrogenated, and separating the hydrogenated oil from the catalyst.

2. Method of preparing a perfuming agent having an odor approximately three times the strength of the starting material which comprises introducing a substance selected from the group consisting of "brown camphor oil" and "artificial sassafras oil" into a closed vessel containing a nickel catalyst, introducing hydrogen into said vessel in amounts sufficient to completely hydrogenate the side chain of the principal odorous constituent of said oil while agitating the contents of said vessel, cooling the resulting hydrogenated oil and separating same from the catalyst.

3. A hydrogenated "brown camphor oil" or artificial sassafras oil" having an odor approximately three times the strength of the starting material produced by complete hydrogenation of the unsaturated side chain of the safrol contained in a material selected from the class consisting of "brown camphor oil" and "artificial sassafras oil."

4. A hydrogenated "brown camphor oil" having an odor approximately three times the strength of the starting material produced by the complete hydrogenation of the unsaturated side chain of the safrol contained in "brown camphor oil."

5. A hydrogenated "artificial sassafras oil" having an odor approximately three times the strength of the starting material produced by the complete hydrogenation of the unsaturated side chain of the safrol contained in "artificial sassafras oil."

6. As a new article of manufacture, soap containing a hydrogenated "brown camphor oil" or "artificial sassafras oil" having an odor approximately three times the strength of the starting material, and produced by complete hydrogenation of the unsaturated side chain of the safrol contained in a material selected from the class consisting of "brown camphor oil" and "artificial sassafras oil," said hydrogenated oil being present in a quantity to mask the "soapy" odor of the soap.

MARION SCOTT CARPENTER.